United States Patent
Martin

(10) Patent No.: US 11,546,874 B1
(45) Date of Patent: Jan. 3, 2023

(54) SYSTEMS AND METHODS FOR REDUCING NETWORK TRAFFIC

(71) Applicant: SYNAPSE WIRELESS, INC., Huntsville, AL (US)

(72) Inventor: Jon Martin, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 0 days.

(21) Appl. No.: 16/852,384

(22) Filed: Apr. 17, 2020

Related U.S. Application Data

(63) Continuation-in-part of application No. 16/824,819, filed on Mar. 20, 2020, now abandoned.

(51) Int. Cl.

| | |
|---|---|
| *H04H 20/71* | (2008.01) |
| *H04W 64/00* | (2009.01) |
| *H04W 4/06* | (2009.01) |
| *H04L 1/18* | (2006.01) |
| *H04L 47/10* | (2022.01) |
| *H04W 24/10* | (2009.01) |

(Continued)

(52) U.S. Cl.
CPC ......... *H04W 64/003* (2013.01); *H04L 1/1858* (2013.01); *H04L 47/15* (2013.01); *H04L 47/17* (2013.01); *H04W 4/06* (2013.01); *H04W 24/10* (2013.01); *H04W 84/18* (2013.01)

(58) Field of Classification Search
CPC . H04W 40/248; H04W 40/023; H04W 84/18; H04W 12/122; H04W 12/12; H04W 12/02; H04W 12/63
USPC ............... 370/468, 390, 254, 338, 406, 328; 709/238
See application file for complete search history.

(56) References Cited

U.S. PATENT DOCUMENTS

| | | | |
|---|---|---|---|
| 7,852,820 B2 | 12/2010 | Ewing et al. | |
| 8,035,491 B2 | 10/2011 | Banks | |

(Continued)

FOREIGN PATENT DOCUMENTS

| | | | | |
|---|---|---|---|---|
| CN | 101848522 A | * | 9/2010 | |
| CN | 105634964 A | * | 6/2016 | ............. H04L 45/16 |
| CN | 105634964 B | * | 12/2018 | ............. H04L 45/16 |

OTHER PUBLICATIONS

Ibana, U.S. Appl. No. 16/012,641, entitled, "Multicast Messaging Based on Distances Estimation of Network Devices," filed on Jun. 19, 2018.

*Primary Examiner* — David Q Nguyen
(74) *Attorney, Agent, or Firm* — Maynard Cooper & Gale, P. C.; Jon E. Holland

(57) ABSTRACT

Systems and methods are provided for reducing network traffic in a mesh network by reducing the number of status messages communicated over the network. The nodes of the network can provide status information to a gateway based on each node's distance from the gateway. The closer nodes respond to the request from the gateway first and then the farther nodes respond to the request. When a node is ready to transmit a status message with status information to the gateway, the node sends the message to the nodes in communication with the transmitting node. One of the closer nodes that receives the message then forwards the message to additional nodes in communication with the forwarding node, while the other nodes that received the message do not forward the message. The process of forwarding messages by a single closer node is repeated until the status information is received by the gateway.

21 Claims, 4 Drawing Sheets

(51) Int. Cl.
*H04L 47/17* (2022.01)
*H04W 84/18* (2009.01)

(56) References Cited

U.S. PATENT DOCUMENTS

| | | | |
|---|---|---|---|
| 9,374,874 | B1 | 6/2016 | Ewing |
| 9,619,989 | B1 | 4/2017 | Ewing et al. |
| 9,870,660 | B1 | 1/2018 | Patterson |
| 10,333,840 | B2 * | 6/2019 | Garcia-Luna-Aceves .................. H04L 67/327 |
| 10,524,335 | B1 | 12/2019 | Thorington et al. |
| 10,660,068 | B2 * | 5/2020 | Bulten .............. H04W 72/0446 |
| 11,269,695 | B1 * | 3/2022 | Klein .................. H02J 13/0002 |
| 2008/0298390 | A1 * | 12/2008 | Kneckt ................... H04L 47/70 370/468 |
| 2011/0182233 | A1 * | 7/2011 | Lee ....................... H04W 40/20 370/328 |
| 2014/0133353 | A1 * | 5/2014 | Jung ..................... H04L 45/026 370/254 |
| 2015/0010153 | A1 * | 1/2015 | Robertson .............. H04K 3/226 380/278 |
| 2015/0043575 | A1 * | 2/2015 | Kumar ................... H04L 45/16 370/390 |
| 2016/0212729 | A1 * | 7/2016 | Bulten .............. H04W 52/0216 |
| 2019/0014497 | A1 * | 1/2019 | Turon .................. H04L 1/1848 |
| 2020/0220660 | A1 * | 7/2020 | Hartman ............. H04L 12/2816 |
| 2020/0344667 | A1 * | 10/2020 | Zhang ................ H04W 40/248 |

\* cited by examiner

SYSTEMS AND METHODS FOR REDUCING NETWORK TRAFFIC

CROSS REFERENCE TO RELATED APPLICATIONS

This application is a continuation-in-part of and claims priority to U.S. patent application Ser. No. 16/824,819, entitled "Systems and Methods for Reducing Network Traffic" and filed on Mar. 20, 2020, which is incorporated herein by reference.

BACKGROUND

A mesh network having a plurality of interconnected nodes can be incorporated into a control system, such as a lighting control system, used in a facility. Each of the nodes of the mesh network can be connected to and/or incorporate one or more components (e.g., sensors, modules, fixtures, local controllers, etc.) of the control system to permit communication between the components and a site controller. The communications can include instructions to the components from the site controller and status messages from the components to the site controller. The site controller can use the information from the status messages to refine operation of the control system or perform other tasks. One type of status message that may be sent to the site controller is a sensor measurement, such as a power usage measurement, from a sensor. The reporting of sensor measurements by components of the control system can result in a significant amount of traffic that may increase congestion on the network. The increased network congestion may cause sluggish response times, missed events, or limit traffic for other industrial control systems sharing the mesh network.

Status messages to the site controller can typically be transmitted by the components of the control system using either unicast messaging or multicast messaging. Unicast messaging involves the transmission of a message from a component to the site controller along a defined path or route of intermediate nodes of the mesh network. One drawback to using unicast messaging is that there can be significant traffic generated to discover or find routes through the network. In addition, unicast messaging is often highly reliable as it typically utilizes acknowledgments to confirm that a message is successfully received by the next node as the message hops from node-to-node along a route. However, the additional traffic from route discovery and acknowledgments can dramatically increase network traffic, in many cases limiting the density or scale of the network.

In multicast messaging, a message from a component is broadcast through a network without following a specific route, unlike unicast messages. That is, each node that receives a multicast message generally retransmits it so that other nodes in the network may also receive the message. To prevent a multicast message from endlessly propagating through the network, a multicast message has a value, referred to as a "time-to-live" or "TTL" value, which is decremented by the node that is retransmitting it. Once the TTL value falls below a threshold, the nodes stop retransmitting the message thereby stopping the message from continuing to propagate through the network.

Since multicast messages do not follow defined routes but rather are broadcast by the network, this type of messaging does not require routing tables, thereby obviating the need for route discovery by the nodes. In addition, acknowledgements are not typically used with multicast messages, thereby making communication less reliable. In general, it is expected that the sheer volume of retransmissions of the multicast message helps to ensure that the multicast message is successfully received as is needed, but without acknowledgements, there typically is no guarantee of successful delivery of the message to any given node.

Thus, using multicast messaging can help to improve network bandwidth by reducing or eliminating acknowledgements and traffic required to find and maintain routes through the network, but multicast messaging is generally less reliable since it does not typically ensure successful delivery through the use of acknowledgements. In addition, the bandwidth savings realized by reducing or eliminating route discovery messages is somewhat offset by traffic increases resulting from the many retransmissions of a multicast message by each node that receives it until its TTL value falls below a threshold. That is, the broadcast nature of a multicast message generally results in a higher volume of traffic relative to the transmission of a unicast message that follows a discrete path through the network.

Indeed, if a large number of nodes attempt to transmit multicast messages at the about the same time, then a significant number of data collisions would likely occur, and it is unlikely that many of the multicast messages would be successfully communicated throughout the network. For this reason, attempts have been made to control the timing of messages for collision avoidance. As an example, for sensor networks having a large number of nodes that may transmit status messages over time, attempts have been made to stagger the transmission of such messages. As an example, a site controller may synchronize the transmission of status messages by broadcasting a multicast message, referred to hereafter as a "status request," requesting the nodes to generate and transmit status messages in response to this multicast message from the site controller. Each node may be assigned a respective window in which to reply to the status request. Thus, the replies may be staggered in time so that data collisions between replies are reduced. However, utilizing such transmission windows increases the complexity of the system. In addition, the size of the network may be limited by window availability.

SUMMARY

The present disclosure generally pertains to systems and methods for reducing network traffic. More specifically, in some embodiment of the present disclosure, the number of status messages communicated by the nodes of a mesh network in response to a status request is reduced. The requested status information provided by the nodes may include power information or other types of status information that does not require immediate communication by the nodes of the mesh network (i.e., the communication of the requested information by a node may be delayed by an acceptable amount).

A site controller can broadcast a status request to any or all of the nodes of the mesh network in order to collect the desired status information from the nodes. The site controller can send out status requests at a preselected reporting interval (e.g., every fifteen minutes), but may also send out requests at varying intervals, intermittently or as needed. In some embodiments, the status request is a multicast message. Thus, once a node receives a status request, the receiving node forwards (or retransmits) the request to other nodes of the network such that all of the nodes of the mesh network may receive the status request. In addition to requesting status information, the request can also include information that permits each node to determine a distance from the site controller (i.e., a node distance) and a reporting window size that permits each node to determine a time to transmit the requested status information to the site controller. The node distance can correspond to the number of hops needed for a message from the node to reach the site controller.

The nodes of the mesh network can be organized into groups based on the node distance of the nodes. For example, all of the nodes that are one hop away from the site controller (i.e., nodes having a node distance of 1) can be grouped in one group, while all the nodes that are two hops away from the site controller (i.e., nodes having a node distance of 2) can be grouped into another group. The grouping process can continue until all of the nodes of the mesh network are placed into a corresponding group. In addition, the node distance can also be used to determine the relative position (with respect to the site controller) of the nodes. For example, a first node can be considered "closer" to the site controller than a neighboring node, if the node distance for the first node is less than the node distance for the neighboring node. Similarly, a first node can be considered "farther" from the network access device than a neighboring node, if the node distance for the first node is greater than the node distance for the neighboring node.

Once the nodes receive the status request, the nodes can report status information to the site controller in a status message based on the relative proximities of the nodes. As an example, a group of closer nodes transmits status messages to the network access device before a group of farther nodes starts to transmit status messages. For example, the nodes in the first group (i.e., the nodes that have a node distance of 1) schedule and begin reporting status information in status messages before the nodes in any of the other groups start scheduling and reporting status information. Each of the nodes in the first group can select a random time within the reporting window for the first group to send a status message to the site controller. When the scheduled time for the node to transmit the status message has been reached or occurs, the node transmits the status message as a one-hop multicast message to the nodes one hop away from the transmitting node. Since the site controller is within range of the nodes of the first group, the status message should be received and processed by the site controller.

As each node in the first group transmits a status message, corresponding nodes in the second group within range of the transmitting node receive the status message. Nodes attempt to retransmit a status message only if the node is closer to the site controller than the transmitting node. Thus, the nodes in the second group do not attempt to forward a status message from a node in the first group since the nodes in the second group are farther away from the site controller than the nodes in the first group. The status message sent by the transmitting node includes the node distance of the transmitting node to permit the nodes in the second group to determine whether they are farther away from the site controller. In addition, the nodes in the second group select a random time within the reporting window for the second group. In some embodiments, the reporting windows for node groups further from the site controller are larger as there is likely more nodes in groups that are further from the site controller assuming a relatively constant or similar distribution of nodes throughout the network. In some embodiments, the size of a reporting window is calculated by multiplying a given window size by the group's node distance so that window size of the next successive group farther from the site controller is larger than the window size of the previous group that is closer to the site controller.

When the scheduled time for the node in the second group to transmit the status message has been reached or occurs, the node transmits the status message as a one-hop multicast message to the nodes one hop away from the transmitting node.

The transmitting node then "listens" for a node in the first group (i.e., a closer node) to forward (or retransmit) the status message. When the transmitting node "hears" that the status message has been forwarded (or retransmitted) by a node in the first group, the transmitting node takes no further action with regard to communicating the status message. The node in the first group, upon forwarding the status message, assumes responsibility for the receipt of the status message by the site controller. However, if the transmitting node does not "hear" that the status message has been forwarded within a certain time of its transmission of the status message, the transmitting node can retransmit the status message. The process of checking for forwarding of the status message and retransmitting of the status message (if there is no determination that the message has been forwarded) can be repeated by the transmitting node until the status message has been forwarded by a node in the first group. If the status message has not been forwarded after a predetermined number of attempts or after a predetermined time period has elapsed, the transmitting node may be assigned to a "farther away" group and the node distance for the transmitting node can be correspondingly increased (which also increases the size of its reporting window) when the transmitting node retransmits the status message. The assignment of a node into a "farther away" group permits additional nodes (e.g., the nodes that were in the same group as the transmitting node) to be "closer" nodes for the transmitting node, thereby providing additional paths for the status message to ultimately reach the site controller.

The process of transmitting status messages in groups can be repeated, as described above, until each node (in each group) transmits a status message to the site controller. When a node in a group transmits a status message to the nodes one hop away, each closer node that receives the status message from the transmitting node can select a random time for the closer node to forward the status message, while each farther node that receives the status message does not attempt to forward the status message (since it is farther away). When the scheduled time for the closer node to forward the status message occurs, the closer node can forward the message (and assume responsibility for the forwarding the status message from the group of the closer nodes) unless the node has determined that another node within its group has already forwarded the status message. If the closer node assumes responsibility for forwarding the status message, the closer node attempts periodic retransmissions of the status message unless and until the closer node hears a retransmission of the status message by another node that is even closer to the site controller.

Thus, for each node group, only a single node assumes the responsibility for forwarding the status message and attempts retransmission of the status message, thereby reducing network traffic. However, since multicast messaging is used, there is no need for the nodes to use routing tables or to engage in route discovery in order to populate the routing tables with route information. That is, as with other multicast systems, the network does not require route discovery traffic that is associated with conventional unicast systems. In addition, since only one node per node group attempts retransmission of the status message, the additional messaging associated with the broadcast nature of conventional multicast systems is eliminated or reduced. Further, the network effectively uses a retransmission of a status message by a closer node as acknowledgement that the message is successfully propagating toward the site controller such that the network provides reliability commensurate with unicast messaging without requiring the transmission of separate acknowledgments that otherwise usurp the network's bandwidth.

In some embodiments, in order to keep memory requirements at the nodes low, each node in the mesh network may be configured to assume the responsibility of forwarding a single message or a limited number of messages at a time. As an example, a node that has assumed the responsibility of forwarding a first message may refrain from assuming the responsibility of forwarding another message until the node confirms that the first message has been successfully communicated to a closer node by hearing the first message from the closer node.

One advantage of the present disclosure is a reduction in network traffic resulting from the controlled forwarding of status messages from nodes of the network to a site controller.

Another advantage of the present disclosure is improved reliability in the transmission of status messages since a node is always responsible for ensuring that a status message is communicated to the site controller.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

The present disclosure generally pertains to systems and methods for reducing network traffic. A system in some embodiments of the present disclosure has a mesh network that utilizes multicast messaging for communication. Thus, the system realizes the benefits of avoiding the need to create and maintain routing tables and communicate route discovery typically associated with unicast messaging systems. When data is to be transmitted by a node (referred to as a "source node" in this example) to a destination, such as a site controller, the source node transmits the data in a multicast message. However, such multicast message is not retransmitted by each node that receives it. Rather, the nodes of the network are grouped into a plurality of groups, and only a subset of the nodes within each group attempts to retransmit the multicast message. In some embodiments, a single node of a given group assumes the responsibility of forwarding the message to the next group, and the other nodes of the same group refrain from attempting to retransmit the multicast message, though it is possible for more than one node from a given group to attempt retransmission in other embodiments. Thus, the message hops from group to group with only a subset of the total nodes in the groups attempting retransmission of the message, thereby reducing the amount of traffic required to transmit the message to its destination relative to conventional multicast messaging systems. In addition, the subset of nodes that assume the responsibility of forwarding the message ensure that the message is successively received by a node closer to the destination. Thus, highly efficient and reliable network communication is realized without the need to maintain routing tables or communicate separate acknowledgement messages as is typically done in unicast messaging systems.

Figure 1:
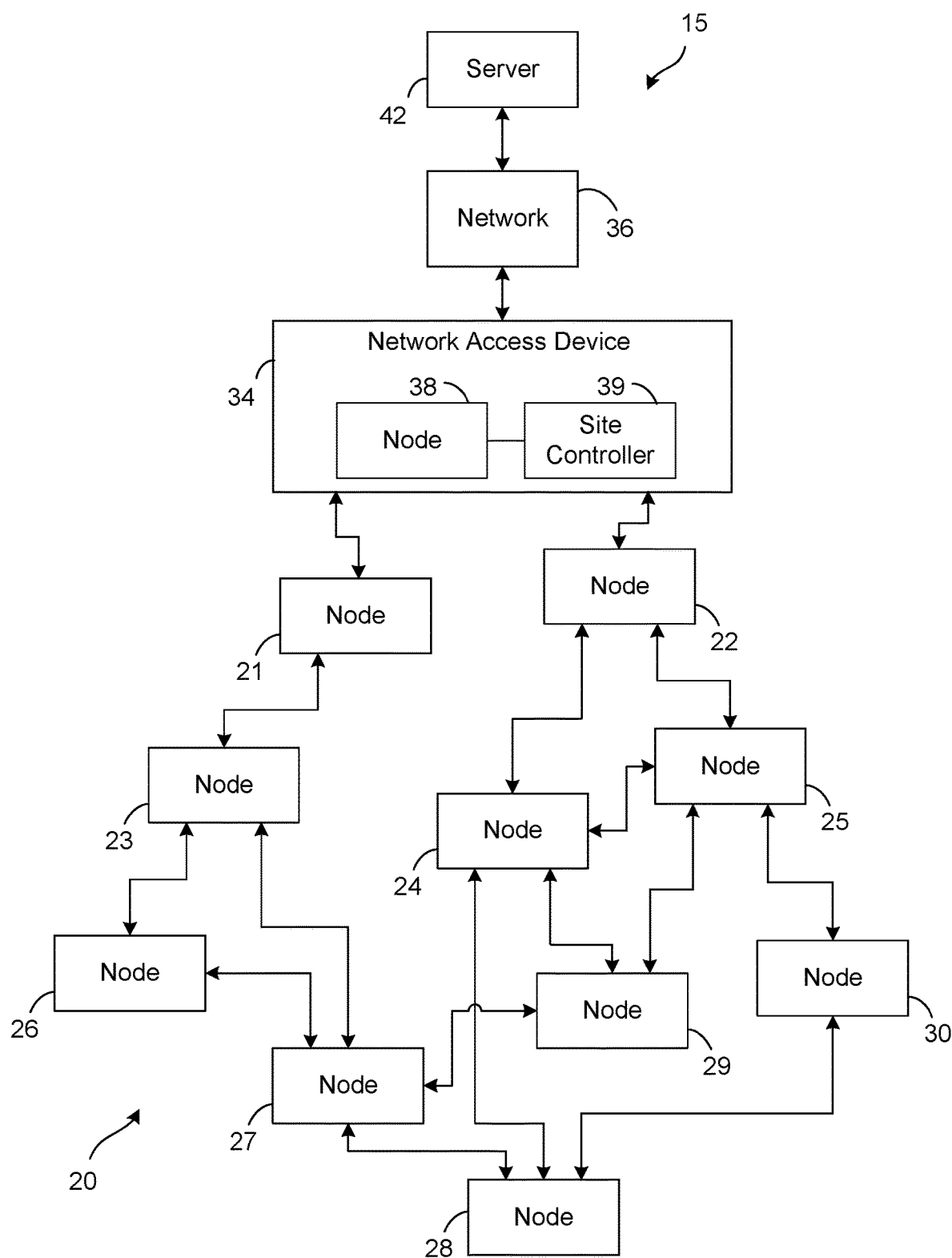
FIG. 1 is a block diagram showing an embodiment of a control system.

FIG. 1 shows an embodiment of a control system 15 at a facility such as a manufacturing plant, office, factory or warehouse. As shown by FIG. 1, the control system 15 can include a network 20 having a plurality of nodes 21-30 to facilitate communication between a server computer 42 and the other components (not shown in FIG. 1) of the control system 15. In the embodiment of FIG. 1, ten nodes 21-30 are depicted for simplicity, but the network 20 may have any number of nodes 21-30 in other embodiments. Each node 21-30 may be assigned to and located at a specific location within a facility (e.g., a particular room or area of a building). In one embodiment, the network 20 can be implemented as a mesh network, but other types of networks may be implemented in other embodiments. Some examples of networks that can be used with the present application are described in: commonly-assigned U.S. Pat. No. 7,970,871, entitled "Systems and Methods for Dynamically Configuring Node Behavior in a Sensor Network," and granted on Jun. 28, 2011; and commonly-assigned U.S. Pat. No. 9,619,989, entitled "Asset Tracking Systems and Methods," and granted on Apr. 11, 2017, both of which patents are incorporated herein by reference.

Each node 21-30 of the network 20 is able to communicate with any of the other nodes 21-30 in the network. In one embodiment, the nodes 21-30 can communicate among one another wirelessly (i.e., via electromagnetic or acoustic waves carrying a signal), but it is possible for any of the nodes 21-30 to communicate over a conductive medium (e.g., a wire or fiber, or otherwise). In the embodiment shown in FIG. 1, the nodes 21-30 form a mesh network, and messages may hop (or travel) from node-to-node in order to reach a destination. For example, node 24 is within range of nodes 22, 25, 28 and 29 and, thus, can communicate directly with any of these nodes 22, 25, 28 and 29, while node 30 is only within range of nodes 25 and 28 and can communicate directly with only nodes 25 and 28. If two nodes are unable to communicate directly (e.g., an obstruction blocks wireless communication between the two nodes or they are otherwise out of range of each other), the other nodes of the network 20 can be used to complete the communication path between the two nodes. As an example, if node 21 is attempting to communicate a message to node 25, the message could be forwarded through at least nodes 23, 27, and 29 in order to reach node 25 since there is no direct communication path between nodes 21 and 25.

At least one of the nodes 21-30 can be communicatively coupled to a network access device (or gateway) 34 through which the nodes 21-30 communicate in order to access a network 36, such as a local area network (LAN), wide area network (WAN) or the Internet. The network access device 34 can interface messages between the protocol of the network 20 and the protocol of the network 36. A server 42 can be connected to the network 36 to communicate with the nodes 21-30 of the network 20 (and the components of the control system 15) via the network access device 34. The server 42 can be provisioned to know the network configuration, including the network address or identifier of the nodes 21-30 and the address or identifier of control system components connected to the nodes 21-30. In other embodiments, the server 42 may be configured to dynamically learn the network configuration.

As shown by FIG. 1, the network access device 34 may include a site controller 39 that is configured to communicate with and control the nodes 21-30 of the network 20. As an example, the nodes 21-30 may be configured to transmit status messages (or other types of messages) that include sensor data captured by sensors coupled to the nodes 21-30 or other types of data, and the site controller 39 may store this data and/or forward the data to the server 42. The site controller 39 may also make control decisions regarding the operation of the nodes 21-30 based on the data in the status messages or otherwise and transmit commands or other types of messages for controlling the operation of the nodes 21-30 or devices that are interfaced with the nodes 21-30. Note that using the network access device 34 to implement the site controller 39 is unnecessary. Indeed, in other embodiments, the site controller 39 may reside at other locations. For illustrative purposes, it will be assumed hereafter that site controller 39 is at the network access device 34 such that transmission of messages to the site controller 39 is essentially synonymous with transmission of messages to the network access device 34. However, it should be emphasized that messages destined for the site controller 39 in other embodiments do not necessarily need to be transmitted to or through a network access device 34. That is, the site controller 39 may be separate from the network access device 34 and reside at a different location. As an example, the site controller 39 may be a stand-alone device that is connected to any of the nodes 21-30 shown by FIG. 1 for enabling communication of network messages, or the site controller 39 may reside at a remote location and communicate with the nodes 21-20 through the network 36 or otherwise.

In one embodiment, the control system 15 can be configured as a lighting control system to control lighting at the facility. In an embodiment, the lighting control system can include one or more lighting modules (not shown in FIG. 1) that incorporate one or more nodes 21-30. In other embodiments, the lighting control system may also include cameras and/or communication devices. A communication device (not shown in FIG. 1) can be carried by a person and can wirelessly communicate directly with network 36 and server 42 and/or can wirelessly communicate with the nodes 21-30 as the communication device is moved through the area(s) of the facility. The communication device can be used by the person to interact with the lighting control system and/or a software application for providing an enhanced experience in the facility.

Figure 2:
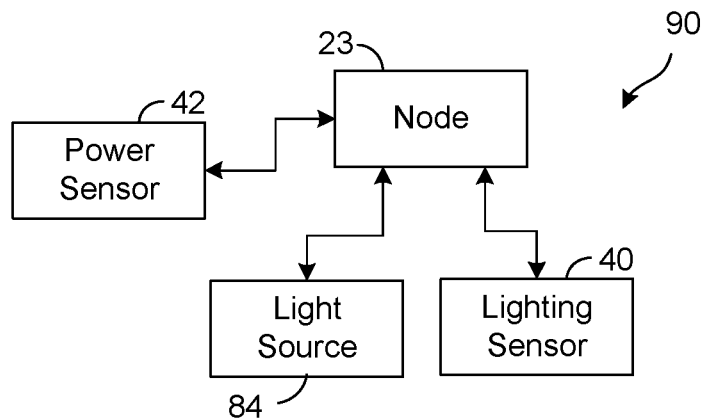
FIG. 2 is a block diagram showing an embodiment of a lighting module.

FIG. 2 shows an embodiment of a lighting module 90. As shown in the embodiment of FIG. 2, the lighting module 90 can include a node 23 of the network 20, a light source 84, power sensor 42 and a lighting sensor 40. In the embodiment of FIG. 2, the lighting module 90 is shown with one node 23, light source 84, power sensor 42 and lighting sensor 40 for simplicity, but the lighting module 90 may have any number of nodes 21-30, light sources 84, power sensors 42 and lighting sensors 40 in other embodiments. In further embodiments, the lighting module 90 may incorporate additional equipment such as cameras, other types of sensors or other devices. In addition, while the lighting module 90 of FIG. 2 is shown incorporating node 23, it is to be understood that any of nodes 21-30 may be similarly used in a lighting module 90 as shown by FIG. 2.

The light source 84 generates light that is used to illuminate the area surrounding the light source 84. In some embodiments, the light source 84 is assembled into a lamp for use with a lighting fixture. As an example, the light source 84 may be implemented by an incandescent bulb, a light emitting diode (LED), a fluorescent light, or other types of light sources that are assembled into lamps for use in lighting fixtures. Yet other types of light sources are possible in other embodiments. In one embodiment, the light sources 84 of the lighting modules 90 can be mounted in the ceiling of the facility. However, in other embodiments, the light sources 84 can be mounted in other locations in the facility such as on the walls, under cabinets, in the floor or in any other suitable location.

The node 23 can be used to control the lighting state (e.g., the on-state or the off-state), the lighting output aperture position (e.g., all light can exit or a reduced quantity of light can exit), and/or the lighting output intensity or brightness (e.g., a high intensity output or a low intensity output) of the light source 84 connected to the node 23. While not shown in FIG. 2, the lighting module 90 may also include mechanisms, controlled by node 23, to change the direction of light from light source 84 and/or adjust the position and/or orientation of the light source 84.

The lighting sensors 40 can include any combination of optical sensors, proximity sensors, infrared sensors, magnetic sensors, touch sensors, height sensors, temperature sensors, pressure sensors, occupancy sensors or any other appropriate type of sensor. The incorporation of the lighting sensor 40 into the lighting module 90 may permit node 23 to respond directly to certain conditions or events detected by the lighting sensor 40 without having to communicate with the site controller 39 or server 42. For example, the detection of a certain condition by lighting sensor 40 (e.g., a person entering a room) may result in the node 23 adjusting the light source 84 (e.g., switching the light source 84 to the on-state). The power sensor 42 can be used to measure a parameter indicative of the power consumed by the light source 84 during operation of the light source 84.

Referring back to FIG. 1, the nodes 21-30 (and corresponding components) of the control system 15 can be configured to operate as a lighting control system. However, in other embodiments, the control system 15 may incorporate other types of industrial control systems with other types of components and sensors that can operate in conjunction with (or in place of) the lighting control system. For example, the control system 15 may be configured as or may include a pneumatic control system to monitor (e.g., with pressure and/or temperature sensors) and control components of a pneumatic system at the facility and/or an asset tracking system to locate and identify assets (e.g., people and/or objects) in the facility. An example of an asset tracking system that can be used with the present application is described in commonly-assigned U.S. Pat. No. 9,619,989, entitled "Asset Tracking Systems and Methods," and granted on Apr. 11, 2017. An example of a pneumatic system that can be used with the present application is described in commonly-assigned U.S. Pat. No. 10,383,196, entitled "Systems and Methods for Controlling Lighting Conditions in a Manufacturing Environment," and granted on Aug. 13, 2019.

Figure 3:
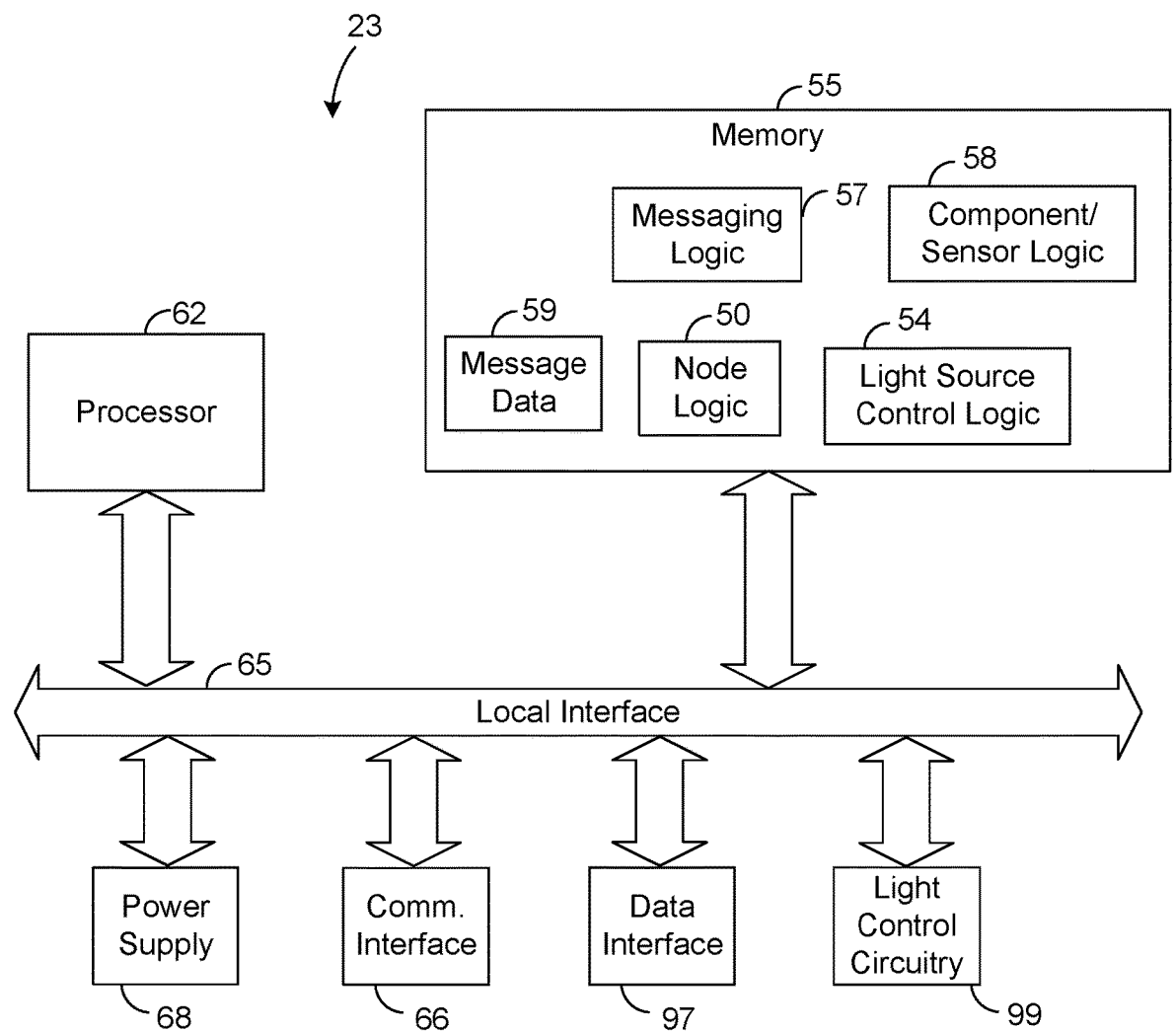
FIG. 3 is a block diagram showing an embodiment of a network node used with the control system.

FIG. 3 shows an embodiment of one of the nodes 23 used in network 20. Note that any of the other nodes may be configured similarly or identical to the node 23 depicted by FIG. 3. The node 23 shown by FIG. 3 can include logic 50, referred to herein as "node logic," for generally controlling the operation of the node 23. The node 23 also includes logic 54, referred to herein as "light source control logic," for controlling the light sources 84 connected to the node 23, logic 57, referred to herein as "messaging logic," for controlling the transmission of messages by node 23 and the processing of messages received by the node 23 and component/sensor logic 58 for controlling any component (e.g., a camera) or sensor (e.g., power sensor 42 and/or lighting sensor 40) that may be connected to the node 23. In other embodiments, the component/sensor logic 58 and/or the messaging logic 57 can be combined with light source control logic 54. The node logic 50, component/sensor logic 58, the messaging logic 57 and the light source control logic 54 may be implemented in software, firmware, hardware, or any combination thereof. In FIG. 3, the node logic 50, the component/sensor logic 58, the messaging logic 57 and the light source control logic 54 are implemented in software and stored in memory 55. However, other configurations of the node logic 50, the component/sensor logic 58, the messaging logic 57 and the light source control logic 54 are possible in other embodiments.

Note that the node logic 50, the component/sensor logic 58, the messaging logic 57 and the light source control logic 54, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The node 23 includes at least one conventional processor 62, which includes processing hardware for executing instructions stored in the memory 55. As an example, the processor 62 may include a central processing unit (CPU) or a digital signal processor (DSP). The processor 62 communicates to and drives the other elements within the node 23 via a local interface 65, which can include at least one bus.

As shown by FIG. 3, message data 59 can be stored in memory 55 of the node 23. The message data 59 can store a status message generated by messaging logic 57 for subsequent transmission to the site controller 39. In addition, the message data 59 can also store status messages received by the node 23 from other nodes that may be retransmitted by the node 23. The status messages received by node 23 from other nodes can be evaluated to determine whether the received status message should be considered for forwarding by the node 23 (if received from a farther node), may indicate retransmission of a status message sent by the node 23 (if received from a closer node) or may indicate that another node has already forwarded a status message from a farther node (if received from a node having the same node distance). In some embodiments, the number of messages that may be stored in the message data 59 may be limited in order to reduce the node's memory requirements and also to better balance or distribute forwarding obligations throughout the network by limiting how many messages are forwarded by the node during a given time period. As an example, in an embodiment, the message data 59 can be used to store at any given time only one (1) status message to be transmitted by the node 23, which status message may be either a status message generated by the messaging logic 57 of node 23 or a status message received from a farther node, although other numbers of messages may be permitted in other embodiments. If the node 23 receives multiple status messages for retransmission from farther nodes, the node 23 may be configured to only process the first one received and does not process the other status messages until at least successful forwarding of the first message by the node 23 is confirmed, as will be described in more detail below.

The node 23 also has a communication interface 66. The communication interface 66 includes a radio frequency (RF) radio or other device for communicating wirelessly. Using the communication interface 66, the node 23 may communicate with a power sensor 42, another node of the network 20, a camera, a lighting sensor 40, a light source 84, a communication device, the site controller 39 or the network access device 34.

The node 23 can have a power supply 68, which provides electrical power to the components of the node 23 and possibly to components connected to the node 23 such as the light source 84, power sensor 42 and/or lighting sensor 40. In one embodiment, the power supply 68 has an interface that allows it to plug into or otherwise interface with an external component, such as a wall outlet or battery, and receive electrical power from such external component. If desired, the power supply 68 may incorporate one or more batteries to permit the node 23 to be independent of the external power component.

The node 23 can also have light control circuitry 99 (or a light driver) that receives instructions and/or commands from light source control logic 54. The light control circuitry 99 can be connected, either wired or wirelessly, to the light source 84 to control the light source 84. In one embodiment, light control circuitry 99 can control: the lighting state (e.g., the on-state or the off-state) of the light source 84; the dim setting, brightness or lighting output (e.g., a high intensity output or a low intensity output) of the light source 84; the position and/or orientation of the light source 84; the output color of the light source 84; the output direction of light from the light source and/or the position of the output aperture of the light source 84. If a node is connected to more than one light source 84, then the light control circuitry 99 can either have separate circuits or drivers for each light source 84 or the light control circuitry 99 can use circuits or drivers that can control multiple light sources 84. The light control circuitry 99 may include a switch and/or light driver through which current from power supply 68 is provided to the light source 84. Alternatively, the light control circuitry 99 may control a switch and/or light driver located near the light source 84 to permit current from a light source power supply to reach the light source 84.

The node 23 may further have a data interface 97 for connecting to and/or communicating with external components, such as power sensor 42 or lighting sensor 40. In another example, if the node 23 is not connected to a light source 84, it is unnecessary for the node 23 to have the light source control logic 54 or the light control circuitry 99.

Figure 4:
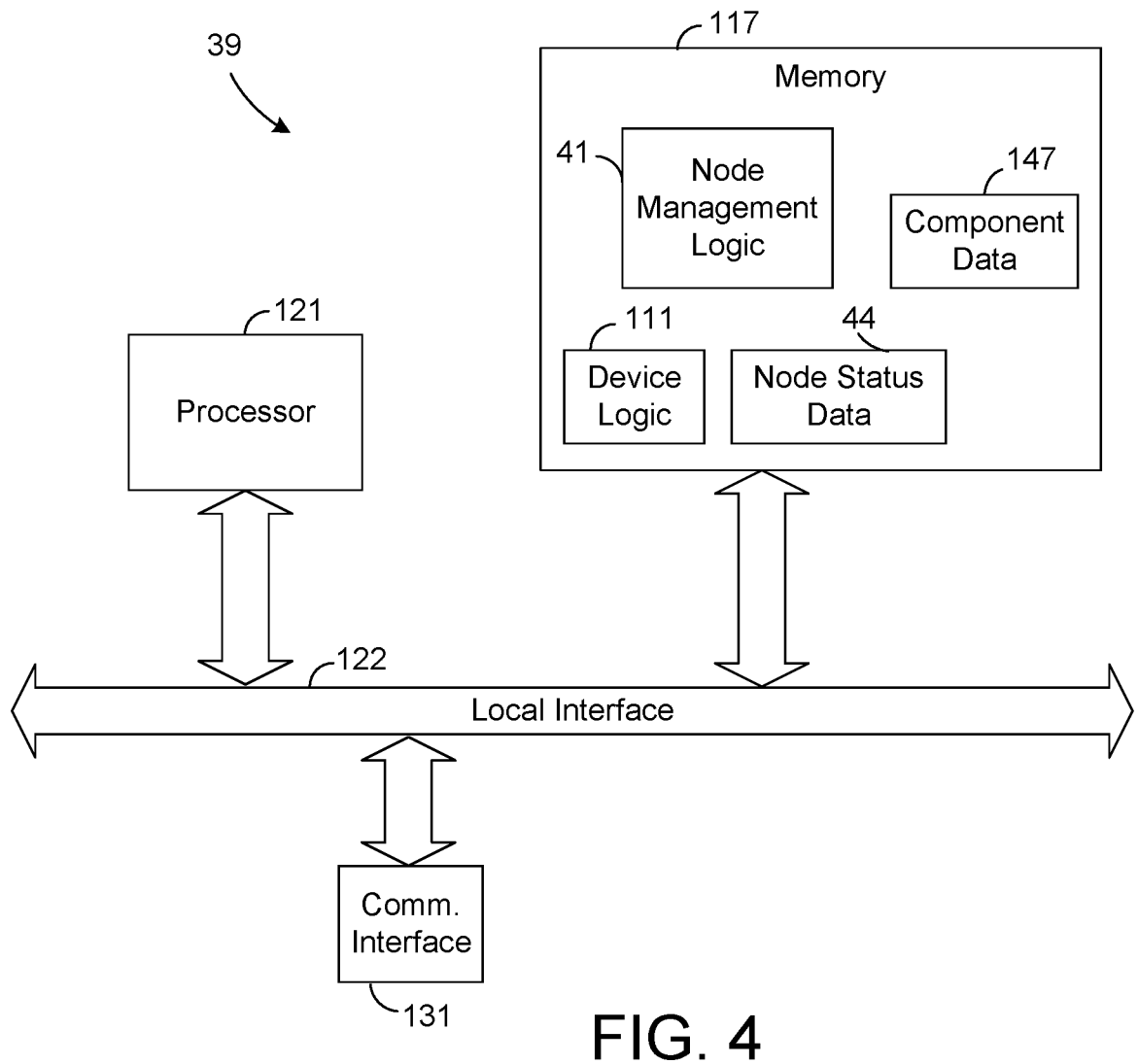
FIG. 4 is a block diagram showing an embodiment of a network access device used with the control system.

FIG. 4 shows an embodiment of the site controller 39, which may or may not be incorporated in the network access device 34. The site controller 39 can include logic 111, referred to herein as "device logic," for generally controlling the operation of the site controller 39, including communicating with the nodes 21-30 of the network 20. The site controller 39 also includes logic 41, referred to herein as "node management logic" to manage certain operations associated with the nodes 21-30 such as the requesting of status information from the nodes 21-30 and the receiving of status information from the nodes 21-30. The device logic 111 and the node management logic 41 can be implemented in software, hardware, firmware or any combination thereof. In the site controller 39 shown in FIG. 4, the device logic 111 and the node management logic 41 are implemented in software and stored in memory 117 of the site controller 39. Note that the device logic 111 and the node management logic 41, when implemented in software, can be stored and transported on any non-transitory computer-readable medium for use by or in connection with an instruction execution apparatus that can fetch and execute instructions.

The site controller 39 can include at least one conventional processor 121, which has processing hardware for executing instructions stored in memory 117. As an example, the processor 121 may include a central processing unit (CPU) or a digital signal processor (DSP). The processor 121 communicates to and drives the other elements within the site controller 39 via a local interface 122, which can include at least one bus. Further, a communication interface 131 may be used to exchange data with the network 36 and/or the nodes 21-30 of network 20.

As shown by FIG. 4, node status data 44 and component data 147 can be stored in memory 117 of the site controller 39. The component data 147 can include information about any component (e.g., light source 84, lighting sensor 40, power sensor 42, etc.) connected to the nodes 21-30 of the network 20. The node status data 44 can store information about the nodes 21-30 or components connected to the nodes 21-30 (e.g., sensor measurements) that is received by the site controller 39 in status messages from the nodes 21-30.

The node management logic 41 can be used to obtain status information about the nodes 21-30 (and corresponding components connected to the nodes 21-30) in the network 20. The node management logic 41 can have the site controller 39 broadcast a multicast message (e.g., a status request) to all the nodes 21-30 requesting each of the nodes 21-30 provide status information regarding one or more parameters (e.g., sensor measurements) associated with the corresponding node or components connected to the node. In one embodiment, the parameter can be indicative of the power usage of the node. However, in other embodiments, other parameters may be used in place of or in addition to the parameter indicative of power usage. In an embodiment, the node management logic 41 can broadcast the request for status information from the nodes 21-30 at a preselected interval. The preselected interval can be a constant interval (e.g., every 15 minutes) in one embodiment, but may be varied by the node management logic 41 in other embodiments.

When broadcasting the multicast message with the request for status information to the nodes 21-30 of the network 20, the node management logic 41 can include additional information in the request message that the nodes 21-30 can use when responding to the request for status information. The additional information can include a reporting window size that establishes a minimum time period (or time frame) for a group of the nodes to transmit their corresponding status messages as will be described in more detail below. In one embodiment, the reporting window size can be established by the node management logic 41 based on the number of nodes in the network 20 that will receive the request for status information and the amount of time in the predetermined interval before the next request for status information occurs. In an embodiment, the node management logic 41 can establish the reporting window size such that each node is able to transmit a status message during the predetermined interval and that most (or all) of the time period associated with the predetermined interval can be used for the transmission of status messages by the nodes.

The additional information can also include an original time-to-live (TTL) parameter and a decremented TTL parameter, which may have the same value initially when the request message is sent from the site controller 39 or node 38. The decremented TTL parameter is then decremented with each hop of the request message while the original TTL parameter stays the same regardless of the number of hops of the request message. Both the original TTL parameter and the decremented TTL parameter can be used by each node receiving the request message to calculate (or determine) a hop distance (which can correspond to the node distance) for the node (as defined by the number of hops needed for a message to reach a destination (e.g., the site controller 39). For example, a node can determine the hop distance by subtracting the decremented TTL parameter from the original TTL parameter to determine the number of hops the message has taken from the site controller 39 or the node 38 connected to the site controller 39. In addition to being used to determine the hop distance for a node, the decremented TTL parameter can also be used to determine when the nodes should stop retransmitting the request message (e.g., when the decremented TTL parameter reaches 0 or other predefined value).

In an embodiment, after each node determines the hop distance based on the original and decremented TTL parameters in a request, the nodes may the store the corresponding hop distances and then use the stored hop distances when responding to subsequent requests from the site controller 39 (which requests may or may not include the TTL parameters). The site controller 39 can have the nodes re-calculate (or re-determine) the hop distance at preselected times based on the inclusion of TTL parameters and/or a corresponding instruction in a future request. In still other embodiments, the hop distance for a node can be determined using other suitable techniques such as when a node is provisioned into the network.

In response to receiving a status request from the site controller 39, each node 21-30 preferably transmits a status message to the site controller 39. In this regard, the messaging logic 57 of each node 21-30 may define a status message and include within the message (1) its node identifier (i.e., an identifier that uniquely identifies the node from other nodes of the network 20) as a source address for the message and (2) status data indicating a status of the node, such as one or more values indicative of an amount of power consumed (instantaneous or average) by the node or a device coupled to a node. Thus, when the message is received by the site controller 39, it can use this information to identify the node and determine its status. In other examples, other types of messages may be transmitted.

In some embodiments, the status messages sent by the nodes 21-30 are multicast messages, thereby obviating the need of the nodes 21-30 to establish routes through the network 20, as is typically done for unicast messaging. As an example, each status message transmitted by a node 21-30 may be one-hop multicast message. That is, each status message may have a TTL value set to "1" or some other value that results in the message making a single hop. Thus, when another node receives the message, the node does not immediately retransmit the message, but rather, the node further processes the message to determine whether or not to retransmit the message, as described in more detail hereafter. In other embodiments, the status messages may be of other message types or have other TTL values.

In some embodiments, communication of the status messages is staggered so that the nodes closer to the site controller 39 can attempt communication of their status messages before nodes farther from the site controller 39 begin to attempt communication of their status messages. Various techniques may be used to achieve this effect. In one embodiment, the timing of transmissions of status messages is based on each node's respective location (e.g., hop distance) from the site controller 39.

In this regard, each node 21, 22 of the group of nodes (referred to hereafter as "Group 1") closest to the site controller 39 at the network access device 34 (i.e., within one hop of the site controller 39) immediately schedules a transmission of its status message within a certain reporting window of reception of the status request. In some embodiments, this reporting window starts upon or near reception of the status request and has a size or duration indicated by the reporting window size in the status request. Each node 21, 22 within Group 1 schedules a transmission of its status message at a random time within this reporting window and transmits its status message at the scheduled time. Note that randomizing the scheduling, as described, helps to avoid data collisions between messages from nodes attempting to transmit during the same window.

Each of the nodes 23-25 in the next group of nodes (referred to hereafter as "Group 2") farther from the site controller 39 at the network access device 34 (i.e., the nodes 23-25 two hops from the site controller 39) similarly schedule a transmission of its respective status message at a random time within a reporting window. However, the reporting window for a node in Group 2 is not started until the node first receives a status message transmitted by a node in the successive group of nodes closer to the site controller 39 (i.e., Group 1 in this example). Thus, the reporting window for Group 2 is staggered relative to the reporting window for Group 1 such that the reporting window for Group 2 starts later than the reporting window for Group 1. In addition, the size or duration of the reporting window for each group of nodes is preferably larger the farther the group is from the site controller 39 at the network access device 34. Thus, the size or duration of the reporting window for Group 2 is greater than the size or duration of the reporting window for Group 1. In one embodiment, the reporting window for the next successive group farther from the site controller 39 is larger than the size of the reporting window for the previous group. Thus, the nodes of Group 2 calculate a reporting window that is twice as large as the reporting window for Group 1. The larger reporting window may be achieved by multiplying the reporting window size indicated by the status request by a multiplier equal to the group's hop distance from the site controller 39. In this case, the nodes 22-25 of Group 2 multiply the indicated reporting window size by "2", the nodes 26, 27, 29, 30 of the next successive group (referred to as "Group 3") multiply the indicated reporting window size by "3", and so on.

Having larger window sizes further from the site controller 39 helps to accommodate a greater number of nodes farther from the site controller 39. In this regard, if the distribution of nodes is fairly uniform, then it can be expected that a greater number of nodes are in groups farther from the site controller 39 since the groups farther from the site controller 39 tend to form larger geographical rings or ring segments around the site controller 39. That is, in general, it is likely that a group farther from the site controller 39 can include a larger number of nodes than a group closer to the site controller 39, and increasing the sizes of the reporting windows based on hop distance helps to accommodate this expected increase in the number of nodes for groups farther from the site controller 39.

Note that there are various techniques that the nodes 21-30 can use to determine whether a message was transmitted from a node farther or closer to the site controller 39. As noted above, each node 21-30 may be aware of its hop distance from the site controller 39 at network access device 34 based on the status request that is transmitted by the site controller 39. In addition, when a node 21-30 transmits a status message, the node may include a value indicative of its distance from the site controller 39 (e.g., hop distance) in the status message. Thus, when another node receives the message, this receiving node may compare the hop distance indicated by the message to its own hop distance to determine whether the message was transmitted from a node that is closer to the site controller 39 at the network access device 34.

When a node 21-30 (referred to as "transmitting node" in this example) transmits a status message, it preferably listens for retransmission of the status message by a node that is closer to the site controller 39 at the network access device 34. Note that the transmitting node can detect such a retransmission of a message when it hears a message transmitted by another node having the expected source address (which should be unique for each batch of status messages transmitted in response to the same status request) along with a hop distance smaller than the hop distance of the transmitting node (i.e., indicating that the transmission is from a closer node). Once the transmitting node hears such a retransmission by a closer node, it can assume that the status message previously transmitted by it has been successively received and will be forwarded toward the message's destination (e.g., the site controller 39). At this point, the transmitting node no longer needs to attempt further retransmissions of the status message. That is, the transmitting node uses the retransmission of the status message by a closer node as an acknowledgement that the message has been received by the next node that is to carry the message toward its destination.

However, if the transmitting node does not hear a retransmission of the status message by a node closer to the site controller 39 within a certain time from transmission of the status message by the transmitting node, then the transmitting node assumes that the message has not been successfully received by a closer node and attempts to retransmit the message. The transmitting node continues attempting further retransmissions of the status message in this manner until the transmitting node confirms that the status message has been retransmitted by a closer node, as described above. By performing this confirmation at each hop of the message, delivery of the message to the site controller 39 can be ensured, thereby providing a highly reliable messaging scheme, similar to conventional unicast messaging even though multicast messaging is being employed.

Note that once a transmitting node confirms that the status message being transmitted by it has been retransmitted by a closer node, the transmitting node may then assume the responsibility for retransmitting a status message from a node that is farther from the site controller 39 than the transmitting node and thus attempt to retransmit this message using the techniques described above. That is, the transmitting node retransmits this new status message and continues attempting to retransmit such message periodically until the transmitting nodes confirms that a closer node has attempted retransmission of the same message. Thus, over time, each status message should be forwarded by at least one node of a given group toward the network access device 34 such that the message eventually arrives at the site controller 39.

In one embodiment as shown in FIG. 1, the network access device 34 can include a node 38. The node 38 may be physically connected to the site controller 39 such that status messages from the nodes 21-30 can be received by the node 38 and communicated over a physical medium (e.g., a wire) to the site controller 39. In other embodiments, the node 38 may be incorporated in the site controller 39 or the node 38 and the site controller 39 may be incorporated in a different device if the site controller is not part of the network access device 34. Nevertheless, for each such message received by the node 38, the node 38 may be configured to wirelessly retransmit the message so that the transmitting node 21 or 22 of Group 1 (i.e., the node 21 or 22 that transmitted the status message to the node 38) can confirm that the message has been successfully received and, thus, stop attempting retransmissions of the message.

Notably, in order for a status message to propagate toward its destination, which is the site controller 39 at the network access device 34 in the current example, it is unnecessary for all of the nodes of a group to forward the message. In some embodiments, the nodes 21-30 are configured such that the number of nodes that attempt retransmission of a status message is limited, thereby reducing the overall amount of traffic on the network 20.

In this regard, in some embodiments, a node that is farther from the destination relative to the transmitting node refrains from attempting to retransmit the message. For example, when the node 25 attempts to transmit a status message (which could have originated from the node 25 or another node 26-30 that is farther from the site controller 39), the message may be heard by: (1) a node 21 or 22 in Group 1 that is one hop closer to the site controller 39, (2) a node 24 in the same Group 2 that is the same hop distance from the site controller 39, or (3) a node 29 or 30 in Group 3 that is one hop farther from the site controller 39. Any node that receives the status message and is the same distance or farther from the site controller 39 refrains from attempting retransmission of the status message. For example, if the node 30 receives the status message, the node 30 compares its own hop distance (i.e., three in this example) to the hop distance of the transmitting node 25 indicated within the message (i.e., two in this example) and, based on this comparison, determines that the node 25 transmitting the message is closer to the site controller 39 since the hop distance indicated by the message is less than the hop distance of the node 30. In response, the node 30 discards the status message without attempting to retransmit it. Similarly, if the node 24 receives the status message, the node 24 determines that it is the same hop distance from the site controller 39 as the transmitting node 25 and, therefore, discards the status message without attempting to retransmit it. Thus, when a status message is transmitted, only nodes that are closer to the destination (e.g., having a smaller hop distance) are permitted to attempt retransmission of the message.

In addition, within a group of nodes that are the same hop distance from the site controller 39, only a limited number of nodes are permitted to attempt retransmission of a given status message. In one embodiment, the first node of such group that attempts retransmission assumes the responsibility of ensuring that the message is successfully received by the next group of nodes and the other nodes of the same group refrain from attempting retransmissions of the message. Thus, for each group of nodes of the same hop distance, only a single node should attempt retransmission of the message.

As an example, assume that a status message transmitted by the node 30 of Group 3 is received by nodes 24 and 25 of Group 2, which both have a hop distance of 2. Upon receiving the status message, each node 24 and 25 determines that the message has been transmitted by a node that is farther from the site controller 39 (since the hop distance indicated by the message is greater than the hop distance of the nodes 24 and 25) and stores the status message. Since both nodes 24 and 25 are closer to the site controller 39 than the transmitting node 30, both nodes schedule the message for transmission at a random time. After storing the message, both nodes also listen for a retransmission of the message from another node in the same Group 2. If such a retransmission is heard by either of the nodes 24 or 25 before the node attempts retransmission of the status message, then the node discards the message without attempting to retransmit it. In such a situation, there is another node of the same Group 2 that has assumed the responsibility of forwarding the message to the nodes of the next Group 1, and there is no need for another node of Group 2 to attempt retransmission of the message. However, if either node 24 or 25 arrives at its scheduled time for transmitting the status message without hearing a retransmission of the message from another node of the same Group 2, then the node assumes the responsibility of transmitting the message to the nodes of the next Group 1 that is closer to the site controller 39 and attempts such a retransmission using the techniques described above.

As an example, in the foregoing example, assume that node 25 randomly schedules transmission of the status message from node 30 at a time prior to the time that the node 24 randomly schedules transmission of the status message. In such case, when the node 25 arrives at the time of the scheduled transmission of the status message, the node 25 has yet to hear a retransmission of the message by any other node 23 or 24 of the same Group 2. Thus, the node 25 assumes the responsibility of the forwarding the status message to the nodes of the next Group 1. That is, the node 25 transmits the status message and periodically retransmits the message until the node 25 hears a retransmission of the message by a node 21 or 22 of Group 1 closer to the site controller 39. Further, upon transmission of the status message by the node 25, the node 24 should hear such transmission. Based on the hop distance indicated by the message and the source address of the message, the node 24 can determine that the received message is a retransmission, by another node in the same Group 2 (i.e., at the same hop distance as node 24) of a status message that is scheduled for transmission by the node 24 but has not yet been transmitted by the node 24. In response, the node 24 may be configured to discard the status message such that the node 24 does not attempt to retransmit the message. Thus, even though both nodes 24 and 25 of the same Group 2 heard the status message transmitted by the node 30, only one of these nodes 25 attempts retransmission of the status message.

Note that the foregoing description generally assumes that each node is able to communicate with another node that is in a group closer to the site controller 39. However, this may not always be the case. In such a situation, a node that is unable to successfully communicate with a node that is closer to the site controller 39 may update its hop distance from the site controller 39 so that the node has more neighbors capable of forwarding its messages according to the messaging described for the instant embodiment. For example, in the current embodiment for which the node 25 has assumed the responsibility of forwarding a status message to a node 21 or 22 of Group 1, assume that the link between the node 25 and 22 becomes degraded such that successful communication between the nodes 25 and 22 is no longer possible. Further, assume that the node 25 is unable to communicate with any other node of Group 1. After a certain number of attempts of transmitting a status message without hearing a retransmission of the status message by a closer node, the node 25 may assume that it no longer has neighbors in Group 1.

In such a case, the node 25 may be configured to increase its hop distance (e.g., from two to three). By increasing its hop distance, nodes that otherwise would not attempt retransmission of its messages may now be configured to attempt such retransmissions. As an example, after the node 25 increases its hop count from two to three, its next transmission of the status message will have a hop distance associated with Group 3 (i.e., indicating that the message is being transmitted by a node the is three hops from the site controller 39). Thus, when the node 24 receives the message, the node 24 now determines that the message has been received from another node, not within its same Group 2, but rather within Group 3. Thus, the node 24 determines that the message has been received from a node that is farther (in terms of hops) from the site controller 39 and, therefore, stores the message and then schedules the message for retransmission according to the techniques described above. Thus, by increasing its hop distance, the node 25 enables the node 24 previously in the same group as the node 25 to begin forwarding status messages from the node 25, thereby helping the network 20 to recover from a degraded link between the nodes 22 and 25.

For illustrative purposes, various exemplary algorithms for forwarding status messages in accordance with the present disclosure will be described in more detail below. It should be emphasized that various modifications and changes to the described algorithm are possible without departing from the principles of the present disclosure.

Once the network access device 34 broadcasts a status request, as described above, the nodes 21-30 can be in one of two different states. A first state (referred to herein as INITIAL SELF) is for the nodes 23-30 that are not direct neighbors of the network access device 34. The nodes 23-30 in the first state can be waiting to hear a status message from the nodes 21-22 that are closer to the network access device. The nodes 21-22 that are direct neighbors of the network access device 34 can be in a second state (referred to herein as WAIT SEND SELF). The nodes 21-22 can be waiting a random time within a reporting window based on the reporting window size in the status request before transmitting the node's status message. When a node in the first state (INITIAL SELF) determines (or hears) that another node has transmitted a status message, the node schedules a random time to transmit the status message for the node in a window based on the reporting window size and the node distance. In addition, once a node schedules a time to transmit the status message, the node transitions into the second state (WAIT SEND SELF). After a node in the second state (WAIT SEND SELF) transmits the status message (which includes the node distance of the transmitting node), the node transitions into a third state (sometimes referred to as LISTEN SELF FORWARD) and monitors (or listens) for a closer node to forward the status message. The node can monitor for the forwarding of the status message while in the third state (LISTEN SELF FORWARD) for a node monitoring window that corresponds to the reporting window size multiplied by the node distance minus 1.

If a node in the third state (LISTEN SELF FORWARD) does not detect (or hear) that the status message has been forwarded, the node can increment (or increase) the node distance by one and return to the second state (WAIT SEND SELF). If the node in the third state (LISTEN SELF FORWARD) does detect (or hear) that the status message has been forwarded, the node is assured that the status message can eventually be delivered to the network access device and the node can enter a fourth state (INITIAL OTHER) where the node can forward status messages from other nodes that are farther away from the network access device 34. The node can remain in the fourth state (INITIAL OTHER) until the node receives (or hears) a status message from a farther away node (as determined from the node distance in the status message). Once the node receives the status message from the farther away node, the node can enter a fifth state (sometimes referred to as WAIT SEND OTHER) and schedules a random time to forward the status message based on the reporting window size and the node distance. If while waiting for the node's time to forward the status message, the node detects (or hears) that another node has forwarded the status message, the node returns to the fourth state (INITIAL OTHER) and waits to receive another status message from a farther away node. However, if the node does not detect that another node forwarded the status message once the node's time to forward the status message has been reached, the node assumes responsibility for forwarding the message and enters a sixth state (sometimes referred to as LISTEN OTHER FORWARDED). The node can monitor for the forwarding of the status message while in the sixth state (LISTEN OTHER FORWARDED) for a node monitoring window that corresponds to the reporting window size multiplied by the node distance minus 1.

If a node in the sixth state (LISTEN OTHER FORWARDED) does not detect (or hear) that the forwarded status message has been forwarded by a closer node, the node can increment (or increase) the node distance by one and return to the fifth state (WAIT SEND OTHER) to re-forward the status message. If the node in the sixth state (LISTEN OTHER FORWARDED) does detect (or hear) that the status message has been forwarded by a closer node, the node is assured that the status message can eventually be delivered to the network access device 34 and the node can enter a fourth state (INITIAL OTHER) where the node can forward status messages from other nodes that are farther away from the network access device 34. As time passes, all the status messages get forwarded to the network access device 34 and status message traffic can drop to zero since nodes do not forward a status message unless the status message comes from a node farther away from the network access device 34 (as determined from the node distance information included in each status message). In one embodiment, the network access device 34 can dynamically select a reporting window size that permits all of the nodes to respond within a desired timeframe (which can be based on the preselected interval).

Figure 5:
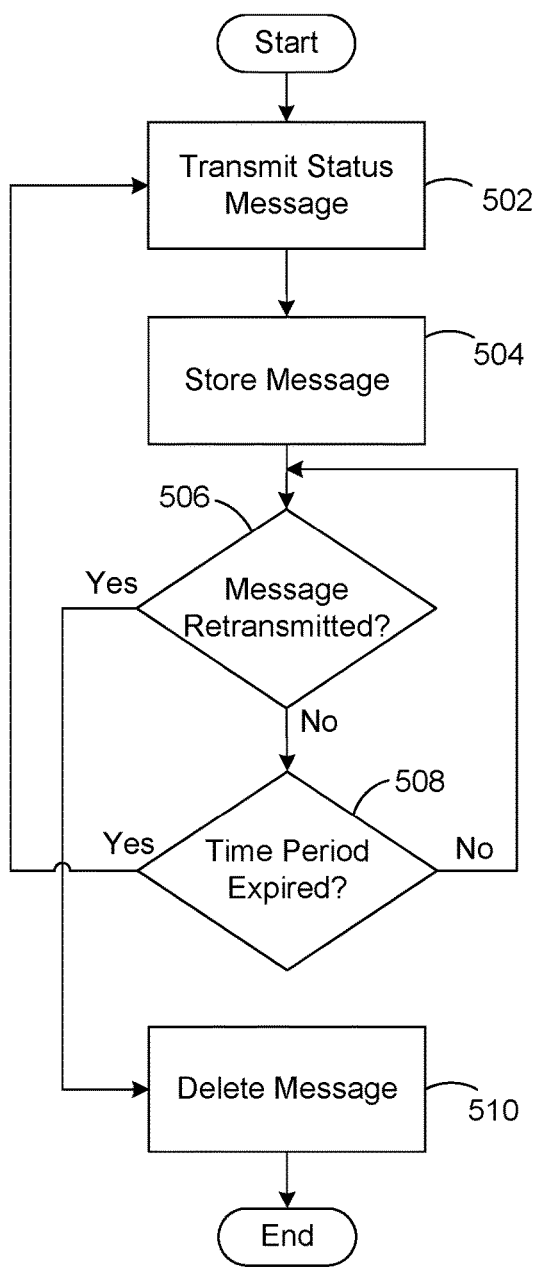
FIG. 5 is a flow chart showing an embodiment of a process for transmitting a status message by a node.

FIG. 5 is a flow chart showing an embodiment of a process for transmitting a status message by a node in response to receiving a status request from the site controller 39. The process begins with the node transmitting its status message to all the nodes that are in direct communication with the transmitting node (i.e., the nodes that are one hop away). The node determines when to transmit the status message based on the hop distance for the node (as may be determined from the status request), the reporting window size (in the status request) and whether a closer node (based on the hop distance) has transmitted a status message. The transmitted status message can then be stored (or buffered), e.g., in message data 59 (step 504). Next, the node can determine whether the transmitted status message has been retransmitted (or forwarded) by a closer node (step 506). The node can determine if the transmitted status message has been retransmitted by determining if the node has received a status message from a closer node (i.e., a node having a smaller hop distance) with an identifier for the transmitting node which indicates that the closer node has retransmitted the status message sent by the transmitting node.

If the status message has been retransmitted by a closer node, the node deletes the stored message (step 510) and the process ends. Once a closer node retransmits the status message, the node that originally transmits the status message relinquishes responsibility for forwarding the status message to the next group of nodes closer to the site controller 39. However, if a closer node has not retransmitted the status message, a determination is made as to whether a predetermined time period associated with the transmission of the status message has expired (step 508). In one embodiment, the predetermined time period can correspond to a time period determined by multiplying the reporting window size and the hop distance minus one (or some other value indicative of hop distance). If the predetermined time period has not expired, the process returns to step 506 to determine again if the message has been retransmitted. Once the predetermined time period has expired, the process returns to step 502 and the node transmits the message again. In an embodiment, after a predetermined number of transmissions of the status message without a closer node retransmitting the status message, the hop distance for the node can be increased by a preselected amount (e.g., one) on a subsequent transmission of the status message such that additional nodes (e.g., nodes having the same hop distance as the transmitting node) can be considered closer nodes to the transmitting node to provide for possible additional paths or routes for the transmission of the status message to the site controller 39.

Figure 6:
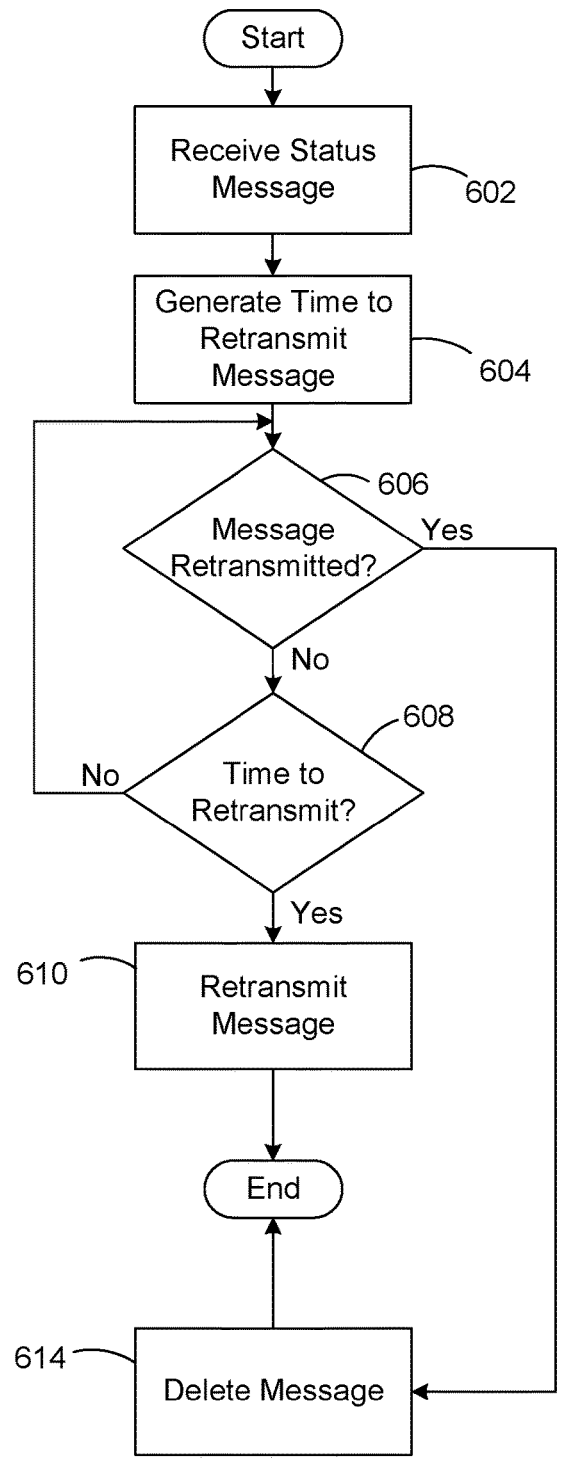
FIG. 6 is a flow chart showing an embodiment of a process for handling a status message received by a node.

FIG. 6 is a flow chart showing an embodiment of a process for processing a status message received by a node. The process begins when the node receives a status message (step 602) from another node in the mesh network. The node that receives the status message checks to see if it is closer to the network access device 34 than the transmitting node (based on the node distance information included in the status message). If the receiving node is not a closer node (i.e., has a larger node distance) than the node that sent the status message, the receiving node can either discard the status message and take no additional action if the receiving node does not recognize the status message or make a determination that the status message has been retransmitted (e.g., step 506 of FIG. 5), if the receiving node initiated the transmission of the status message.

If the receiving node is a closer node (i.e., has a smaller node distance) than the node that sent the status message, the receiving node can store (or buffer) the message (e.g., in message data 59) and generate a retransmission time to retransmit the status message (step 604). In one embodiment, the time to retransmit the status message can be a randomly selected time in a window corresponding to the node distance (of the receiving node) multiplied by the reporting window size. After generating a time to retransmit the status message, the receiving node determines whether another node has already retransmitted the message (step 606). If another node has retransmitted the status message (as determined by the receiving node receiving a status message from another node with the same status information and having the same node distance), the receiving node can delete the status message (step 614) and the process can end. Once another node has retransmitted the status message, the receiving node knows that the other node has assumed responsibility for the transmission of the status message and does not have to retransmit the message.

If another node has not retransmitted the status message, the receiving node can then determine if the retransmission time has occurred for the receiving node to retransmit the status message (step 608). If it is not time to retransmit the status message, the process can return to step 606 to determine if another node has retransmitted the status message. If it is time to retransmit the status message, the receiving node can retransmit the message (step 610) and the process can end (after the receiving node confirms that a closer node has retransmitted the status message). In one embodiment, the process of FIG. 5 can be used to retransmit the status message in step 610 of the process of FIG. 6.

Various embodiments described above are related to the transmission of status messages for a lighting control system. However, the techniques described herein may be used in any other type of system with other types of messages. As an example, the techniques for communicating messages herein may be used in any application for which it is desirable for several nodes to communicate messages to a known destination. In addition, many of the embodiments described above use hop distances to determine whether one node is closer to a destination than another. In other embodiments, other types of information and techniques may be used to make such a determination. That is, rather than using hop distance, nodes may use other types of values indicating their respective locations relative to a destination or other reference point. For example, nodes may use values (e.g., geographical coordinates) to indicate their respective locations, and the nodes may compare coordinate values to determine whether one node is closer to a destination than another. In such example, the nodes may have location sensors, such as global positioning system (GPS) sensors, to determine their locations. In other embodiments, the node locations (e.g., coordinates or hop distances) may be provisioned into the nodes by an installer or other user. In some embodiments, the values used by the nodes may be estimated distances (in feet or other measurement units) of the nodes from a destination or reference point. Various other changes and modifications would be apparent to person of ordinary skill upon reading this disclosure.

Further, various embodiments are described above as using the site controller 39 at the network access device 34 as a reference point for determining the respective locations of the nodes 21-30. However, it is possible for other reference points to be used. As an example, the node 38 may be used as a reference point, and one node 21-30 may determine whether to retransmit a status message based on whether it is closer to the node 38 relative to the transmitting node. It is also possible for nodes 24, 25, 27-29, 30 to use node 22 as a reference point. For simplicity, the reference point used is ideally along a path that a message travels to reach its destination, but other reference points may be used. As an example, the distance values described herein may be relative to a particular reference point not in a path of the message, and the nodes may use this information to determine whether they are closer to the site controller 39 or other point along the path to the site controller 39.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A mesh network for communicating messages to a destination, comprising:
   a first node configured to wirelessly transmit a first message including a first value indicative of a location of the first node in response to a second message received from the destination, wherein the first node is configured to determine the first value based on at least one parameter included in the second message received from the destination, and wherein the first value specifies a distance between the first node and the destination; and
   a plurality of nodes for forwarding the first message to the destination, the plurality of nodes including at least a second node configured to receive the first message and compare the first value to a second value indicative of a location of the second node, the second node further configured to determine whether to wirelessly retransmit the first message based on whether a comparison of the first value to the second value indicates that the second node is closer to the destination than the first node that transmitted the first message.

2. The network of claim 1, wherein the first message is a multicast message.

3. The network of claim 1, wherein the first message is a one-hop multicast message.

4. The network of claim 1, wherein the first value indicates a hop distance of the first node from the destination.

5. The network of claim 4, wherein the second value indicates a hop distance of the second node from the destination.

6. The network of claim 1, wherein the first node is configured to retransmit the first message upon a determination by the first node that the first node has not heard a retransmission of the first message.

7. The network of claim 1, wherein the first node is configured to transmit the first message at a random time within a reporting window calculated by the first node.

8. A method of communicating messages to a destination in a mesh network, comprising:
   determining, by a first node, a first value indicative of a location of the first node, wherein the first value specifies a distance between the first node and the destination;
   transmitting, by the first node, a first message including the first value in response to a second message received from the destination, wherein the determining is based on at least one parameter included in the second message; and
   forwarding, by a plurality of nodes, the first message to the destination, wherein the forwarding includes:
      receiving, by at least a second node of the plurality of nodes, the first message transmitted by the first node;
      comparing, by the second node, the first value from the first message to a second value indicative of a location of the second node; and
      determining, by the second node, whether to retransmit the first message based on whether a comparison of the first value to the second value indicates that the second node is closer to the destination than the first node that transmitted the first message.

9. The method of claim 8, wherein the first message is a one-hop multicast message.

10. The method of claim 8, wherein the first value indicates a hop distance of the first node from the destination and the second value indicates a hop distance of the second node from the destination.

11. The method of claim 8, wherein the transmitting the first message includes transmitting the first message at a random time within a reporting window calculated by the first node.

12. The method of claim 8, further comprising retransmitting the first message, by the first node, upon a determination by the first node that the first node has not heard a retransmission of the first message.

13. The method of claim 8, wherein the distance is a hop distance between the first node and the destination.

14. A method of collecting status information from nodes of a control system for a facility, the method comprising:
   transmitting, by a site controller, a request for status information to a plurality of nodes connected to the site controller;
   determining, by each node of the plurality of nodes based on information in the request from the site controller, a hop distance between the respective node and the destination;
   transmitting, by a node of the plurality of nodes, a status message to at least two first nodes of the plurality of nodes in response to the request, wherein the at least two first nodes are located a single hop from the transmitting node;
   determining, by each first node of the at least two first nodes, whether to forward the status message based on a hop distance for the first node being less than the hop distance for the transmitting node;
   forwarding, by one first node of the at least two first nodes, the status message to at least two second nodes of the plurality of nodes upon determination by the one first node that the hop distance for the one first node is less than the hop distance for the transmitting node, wherein the at least two second nodes are located a single hop from the forwarding node; and
   repeating the steps of determining whether to forward and forwarding of the status message by subsequent nodes until the status message is received by the site controller.

15. The method of claim 14, further comprising retransmitting the status message by the transmitting node upon a determination by the transmitting node that the transmitting node has not heard a retransmission of the status message.

16. The method of claim 14, further comprising:
   measuring a parameter with a sensor at each node of the plurality of nodes; and
   including the measured parameter in the status message transmitted by a corresponding node.

17. A mesh network for communicating messages to a destination, comprising:
- a first node configured to wirelessly transmit a first message including a first value indicative of a location of the first node in response to a second message received from the destination, wherein the first node is configured to determine the first value based on at least one parameter included in the second message received from the destination, and wherein the first value specifies a distance between the first node and the destination; and
- a plurality of nodes for forwarding the first message to the destination, the plurality of nodes including at least a second node configured to receive the first message and compare the first value to a second value indicative of a location of the second node, wherein comparison of the first value to the second value indicates whether the first node is closer to the destination than the second node, the second node further configured to determine whether to wirelessly retransmit the first message based on the comparison such that the second node wirelessly retransmits the first message if the comparison indicates that the second node is closer to the destination than the first node that transmitted the first message.

18. The network of claim 17, wherein the distance is a hop distance between the first node and the reference point destination.

19. A mesh network for communicating messages to a destination, comprising:
- a first node configured to wirelessly transmit a first message to a destination in response to a second message received from the destination, the first node configured to determine a distance of the first node from the destination based on at least one parameter included in the second message received from the destination and to define the first message such that the first message includes a first value specifying the distance; and
- a plurality of nodes for forwarding the first message to the destination, the plurality of nodes including at least a second node configured to receive the first message and compare the first value to a second value indicative of a distance of the second node from the destination, wherein comparison of the first value to the second value indicates whether the first node is closer to the destination than the second node, the second node further configured to determine whether to wirelessly retransmit the first message based on the comparison such that the second node wirelessly retransmits the first message if the comparison indicates that the second node is closer to the destination than the first node that transmitted the first message.

20. The network of claim 19, wherein the distance of the first node from the destination is a hop distance.

21. The network of claim 20, wherein the first node is configured to determine the hop distance based on a time-to-live value in second message received from the destination.

* * * * *